(12) United States Patent
Weir

(10) Patent No.: US 11,498,737 B1
(45) Date of Patent: Nov. 15, 2022

(54) CONTAINER ASSEMBLY WITH MULTIPLE CONTAINER COVER AND SEALING STRUCTURE

(71) Applicant: Fitware L.L.C., St. Paul, MN (US)

(72) Inventor: Marjorie V Weir, St. Paul, MN (US)

(*) Notice: Subject to any disclaimer, the term of this patent is extended or adjusted under 35 U.S.C. 154(b) by 241 days.

(21) Appl. No.: 15/985,481

(22) Filed: May 21, 2018

Related U.S. Application Data

(60) Provisional application No. 62/648,841, filed on Mar. 27, 2018, provisional application No. 62/508,704, filed on May 19, 2017.

(51) Int. Cl.
| | | |
|---|---|---|
| *B65D 77/04* | (2006.01) | |
| *A47J 41/00* | (2006.01) | |
| *B65D 81/38* | (2006.01) | |
| *B65D 21/02* | (2006.01) | |
| *B65D 25/04* | (2006.01) | |

(52) U.S. Cl.
CPC ........ *B65D 77/046* (2013.01); *A47J 41/0077* (2013.01); *B65D 81/3818* (2013.01); *B65D 21/0201* (2013.01); *B65D 25/04* (2013.01); *B65D 81/3865* (2013.01)

(58) Field of Classification Search
CPC .......... B65D 83/04; B65D 77/046; A61J 7/04; A61J 1/03; A47J 41/0077
USPC ...................................................... 220/507
See application file for complete search history.

(56) References Cited

U.S. PATENT DOCUMENTS

| | | | | |
|---|---|---|---|---|
| 4,353,379 | A | * 10/1982 | Castellanos | A24F 19/0064 131/231 |
| 4,741,441 | A | * 5/1988 | Keffeler | A61J 1/03 206/532 |
| 5,957,275 | A | * 9/1999 | Lemaire | A45C 11/26 206/83 |
| 6,669,910 | B1 | * 12/2003 | Bienhaus | B01L 3/5025 422/500 |
| 7,326,428 | B2 | 2/2008 | Weir | |
| D612,894 | S | * 3/2010 | Evans | D21/392 |
| 7,798,330 | B2 | * 9/2010 | Noble | B65D 83/04 206/1.5 |
| 2009/0008395 | A1 | * 1/2009 | Sattler | B01L 3/50855 220/507 |

OTHER PUBLICATIONS

San Jamar, condiment holders, prior to May 21, 2018 (2 pages).
Krowne KR-101 Dipper Style Condiment Dispenser with (6) pans, Mar. 1, 2018 (1 page).

* cited by examiner

*Primary Examiner* — Jeffrey R Allen
(74) *Attorney, Agent, or Firm* — Deirdre M. Kvale; DMK Intellectual Property Law

(57) ABSTRACT

A container assembly for holding containers filled with different items, such as food and cocktail garnishes is disclosed. The container assembly includes a support structure to support a plurality of removable containers. The containers are closed by a cover and sealed by perimeter seals. In illustrated embodiments, the cover includes a plurality of raised or dome shaped portions to provide interior head room for content in the containers. In embodiments described, the perimeter seals are formed of a gasket layer or bands and the support structure includes a support tray and container box.

20 Claims, 15 Drawing Sheets

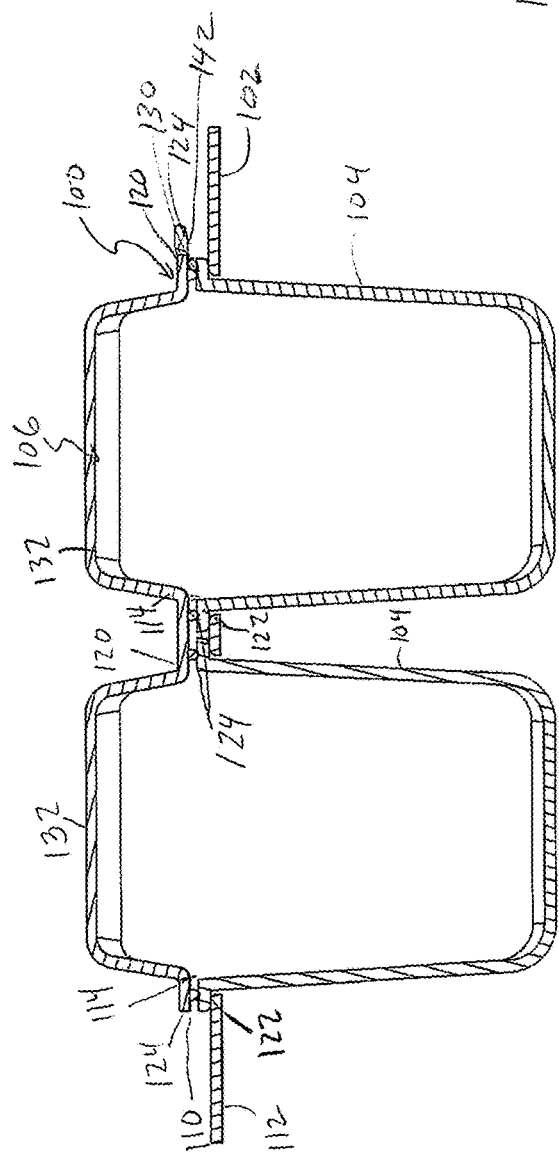
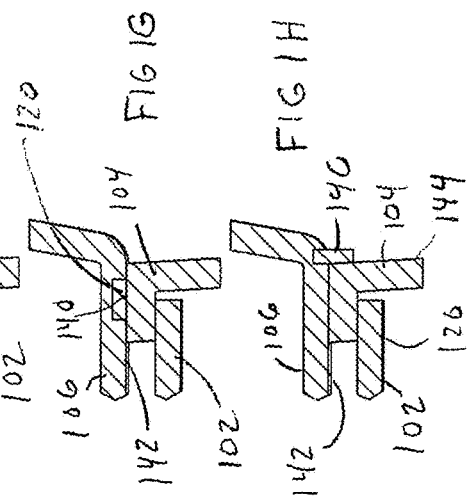
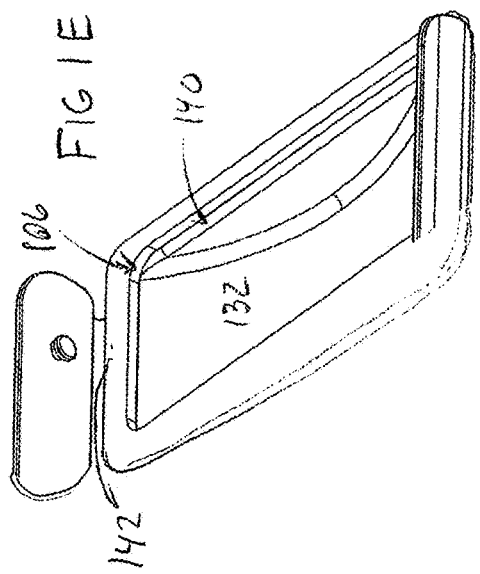

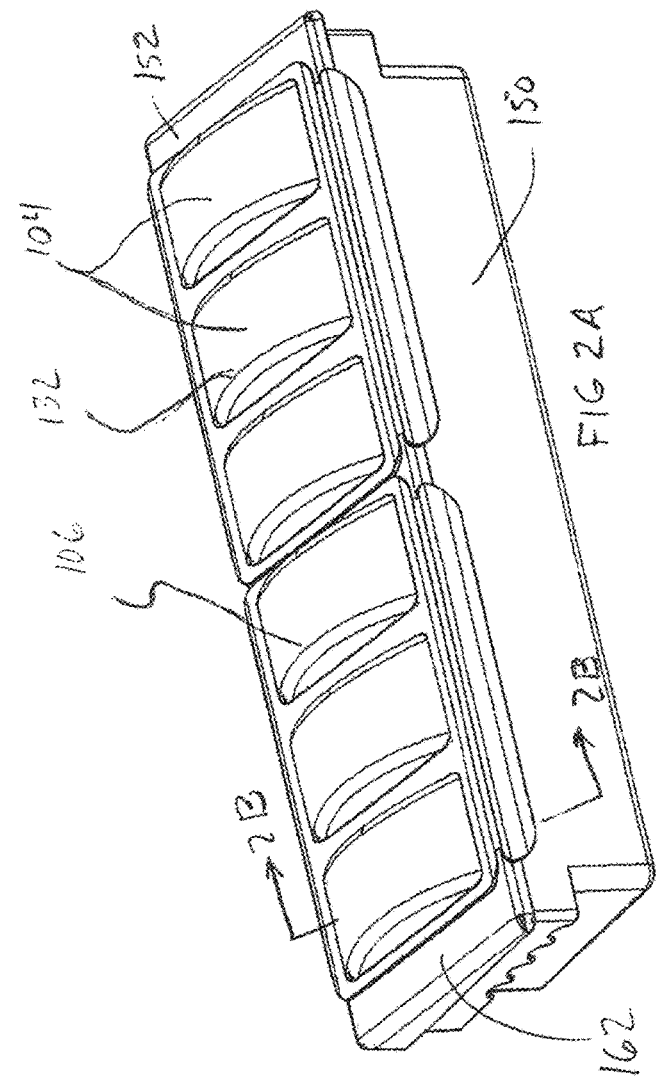
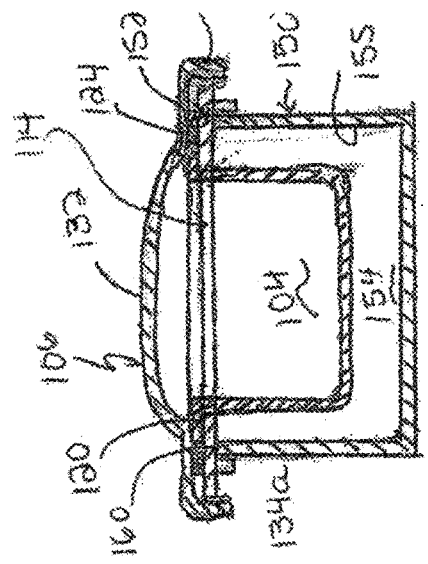
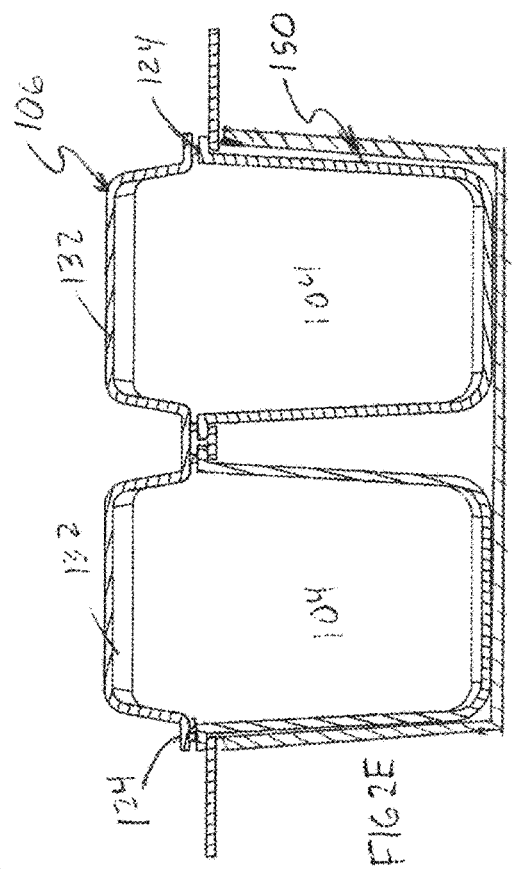
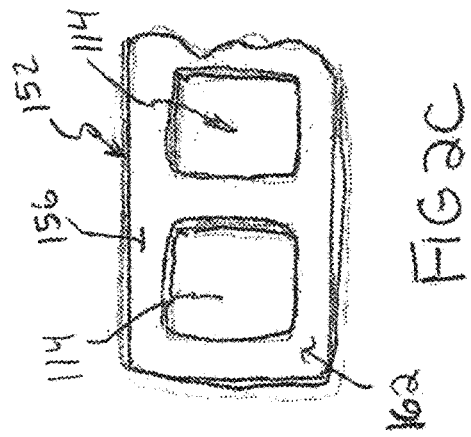
FIG 2A
FIG 2B
FIG 2C
FIG 2E

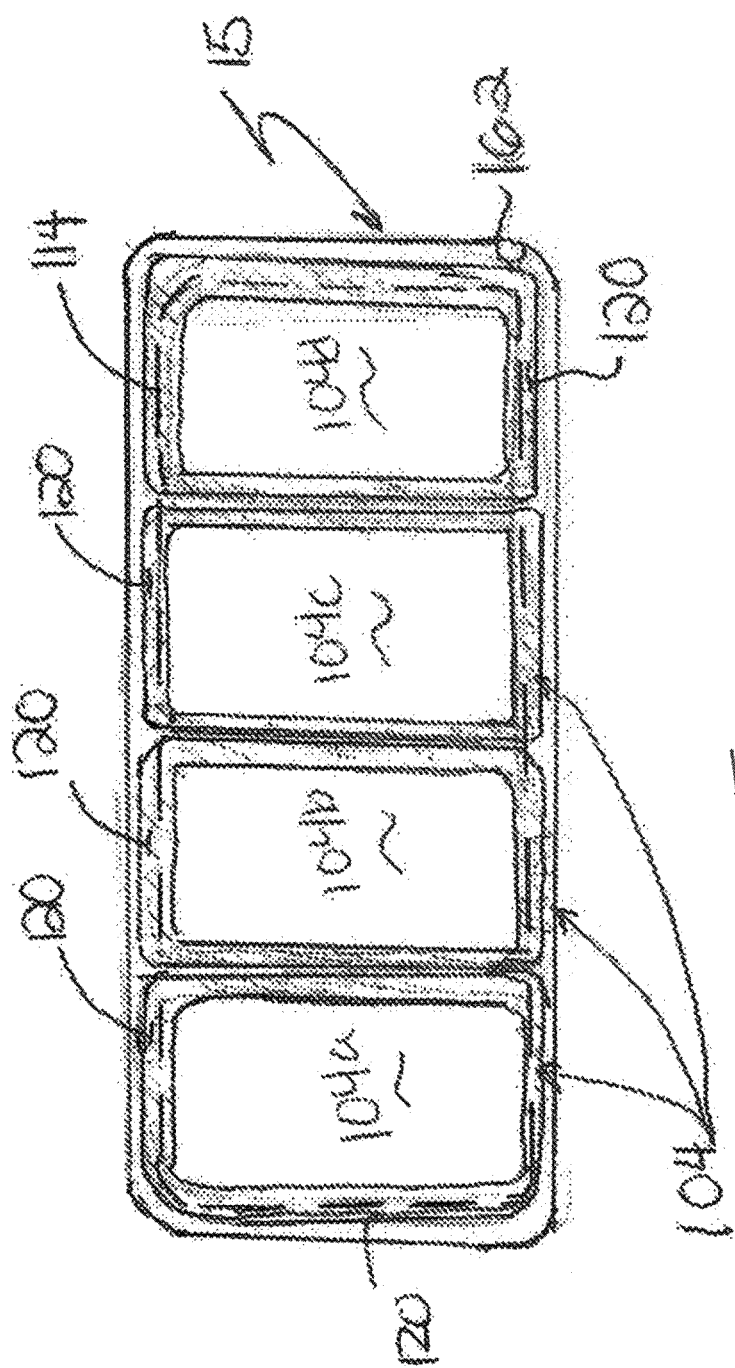

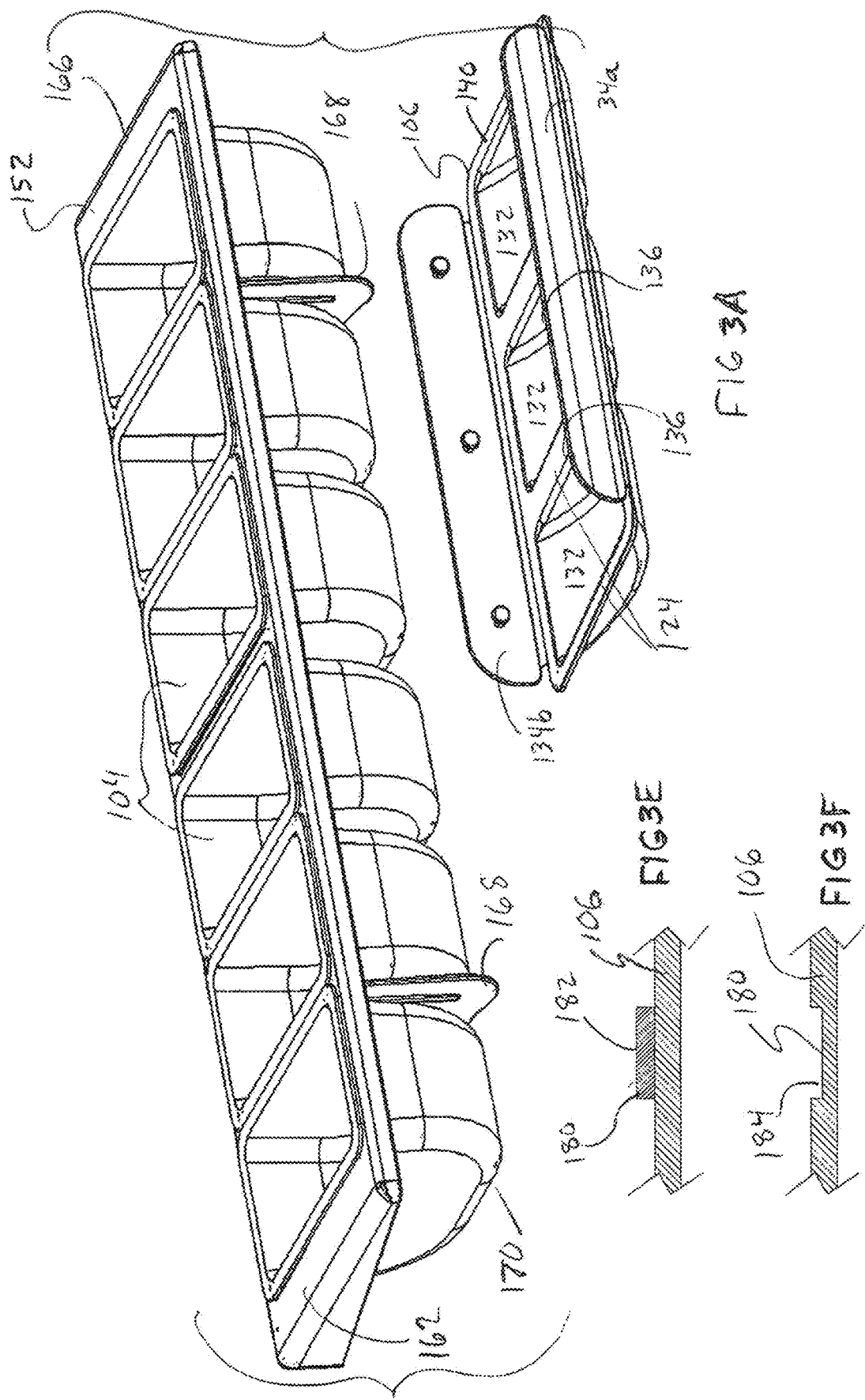

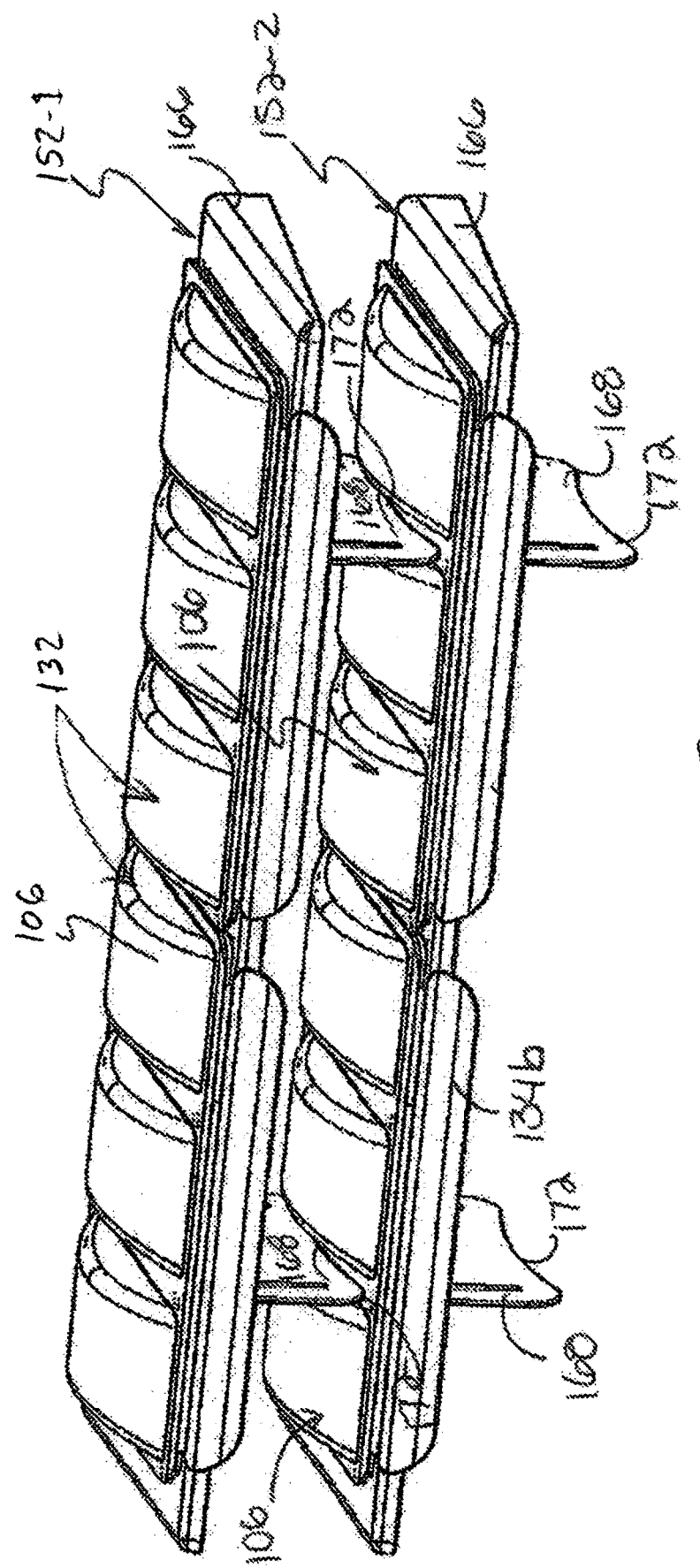

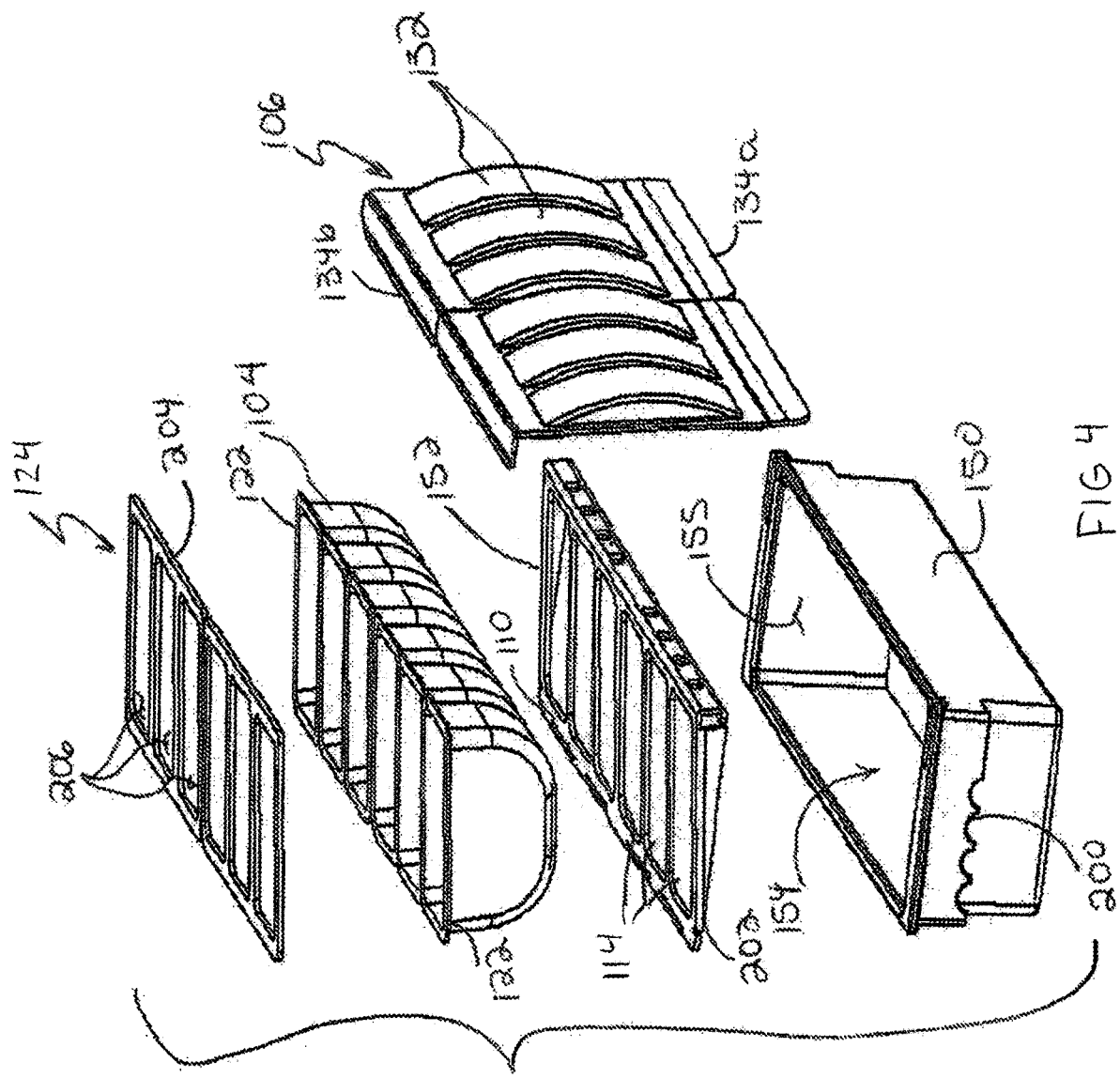

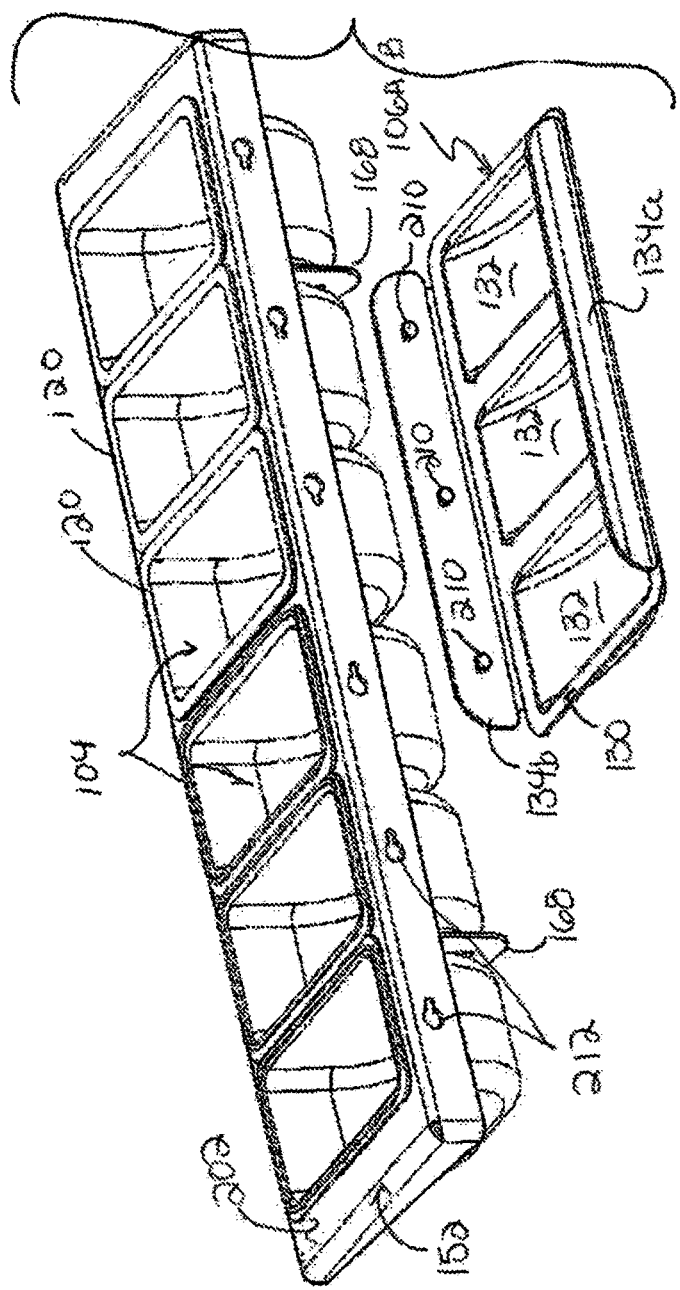
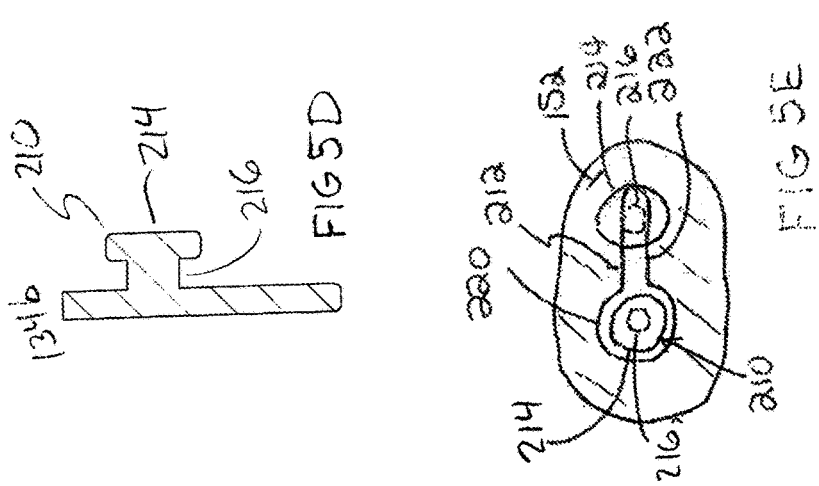

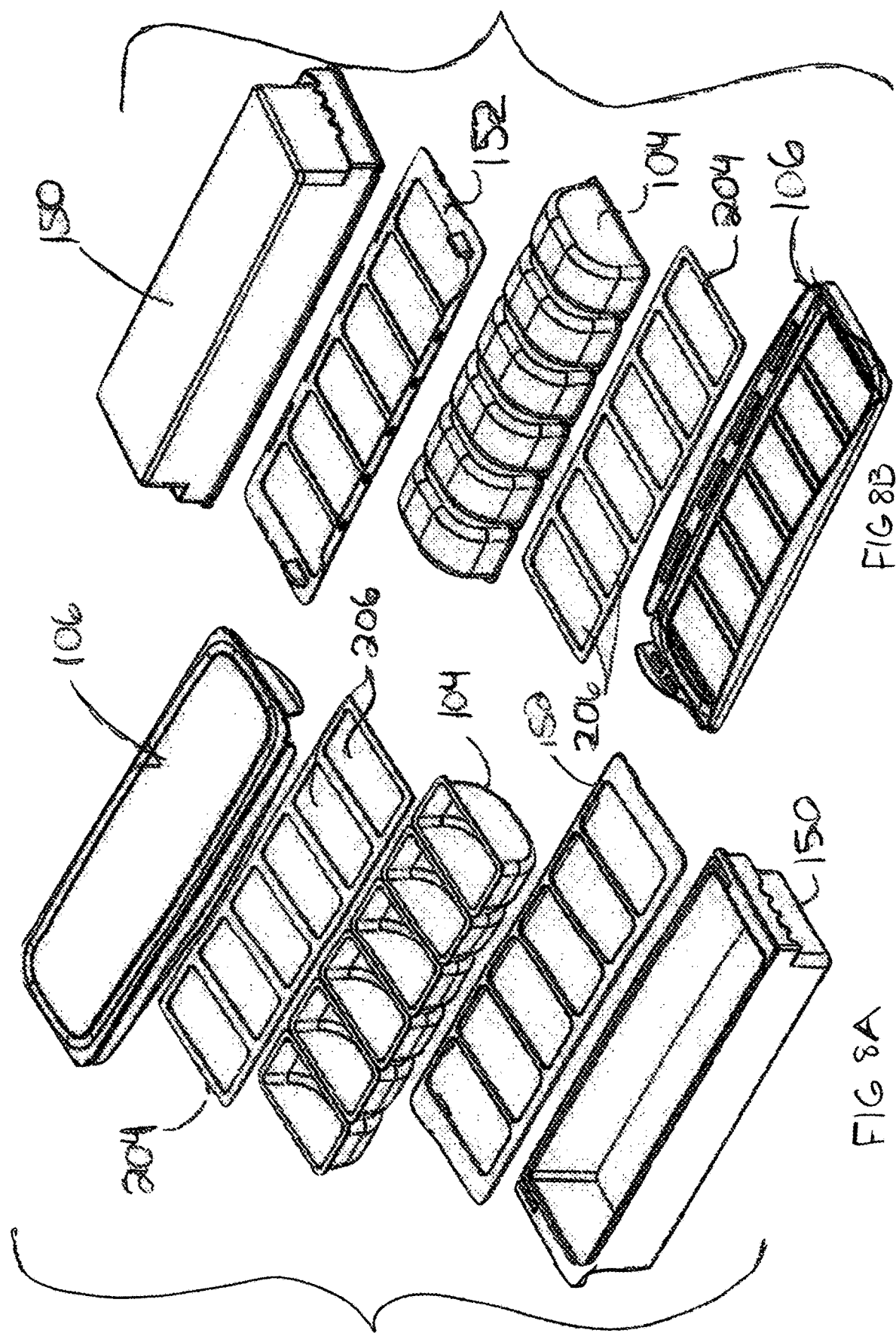

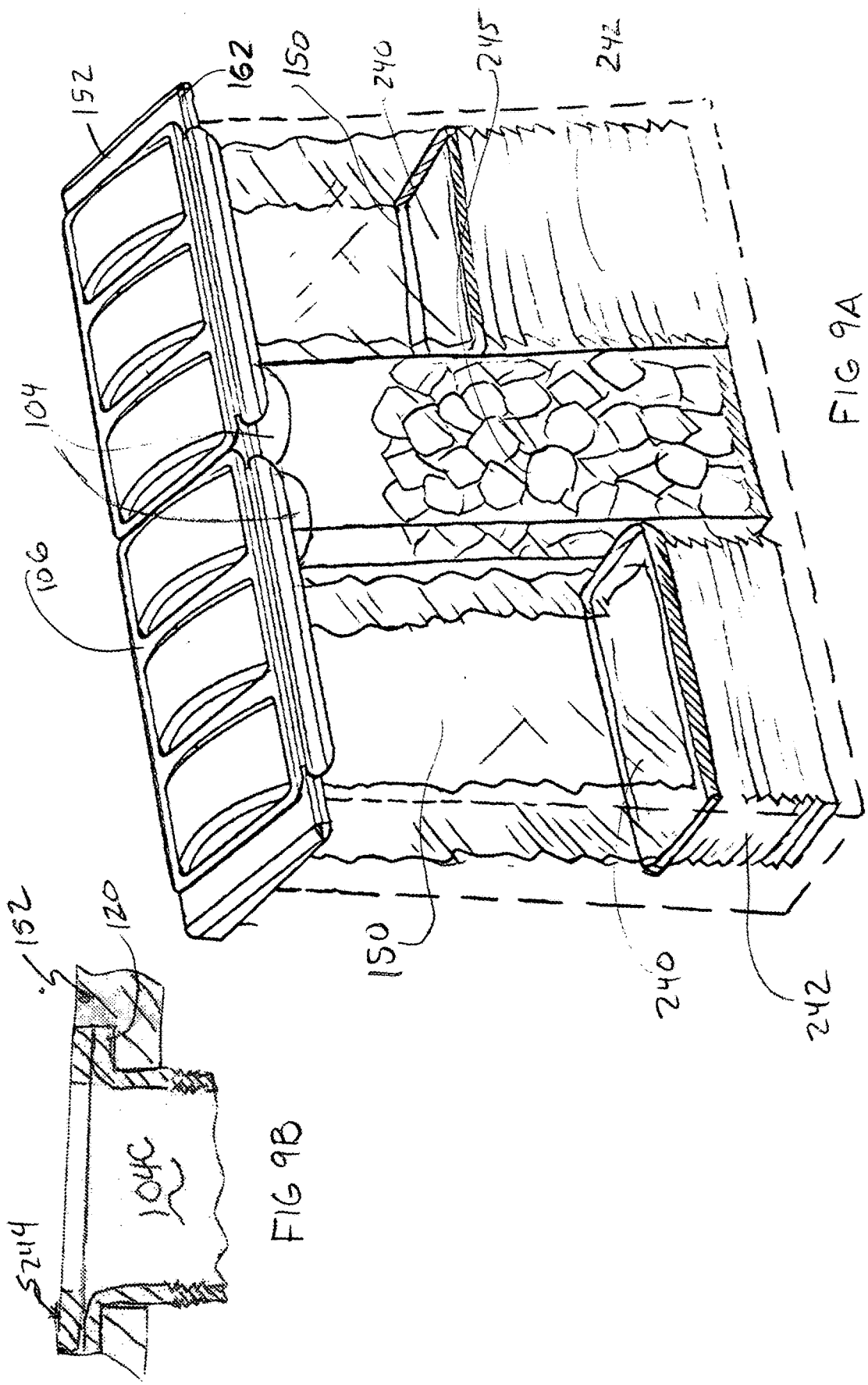

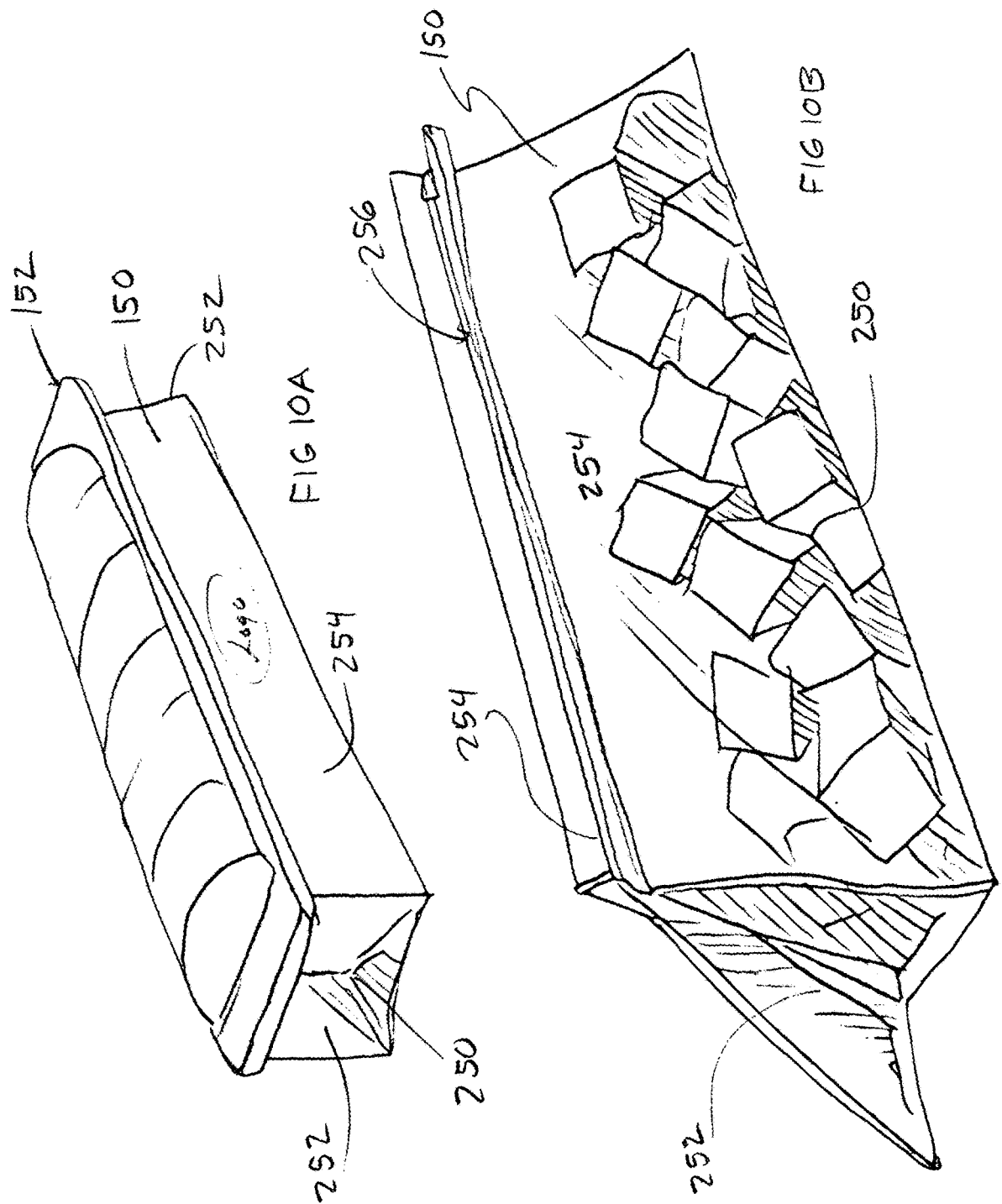

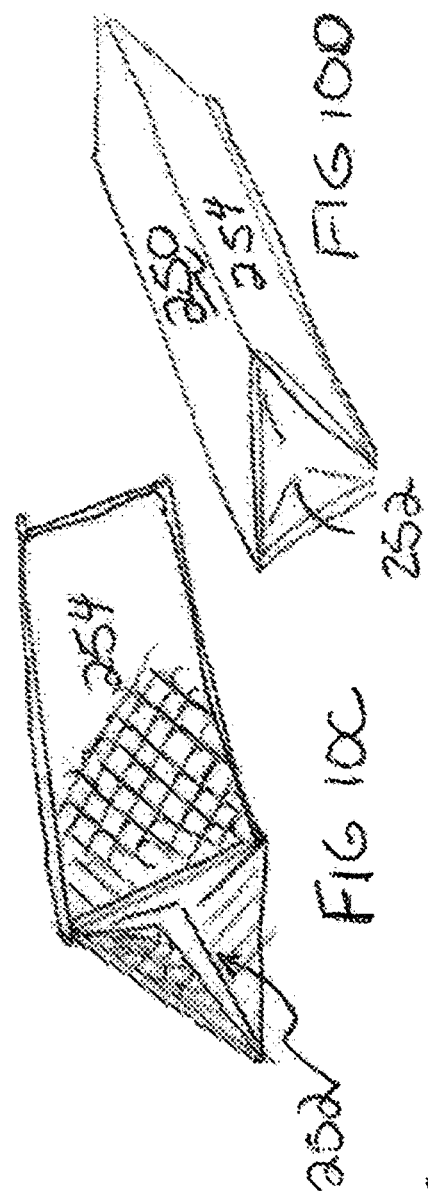
FIG 10C
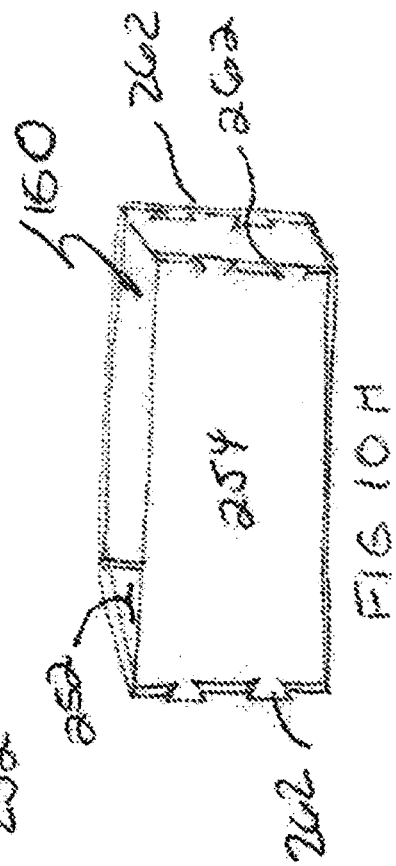
FIG 10D
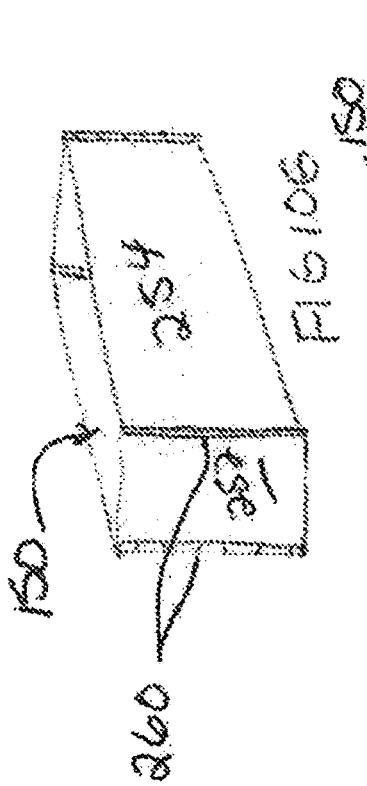
FIG 10G
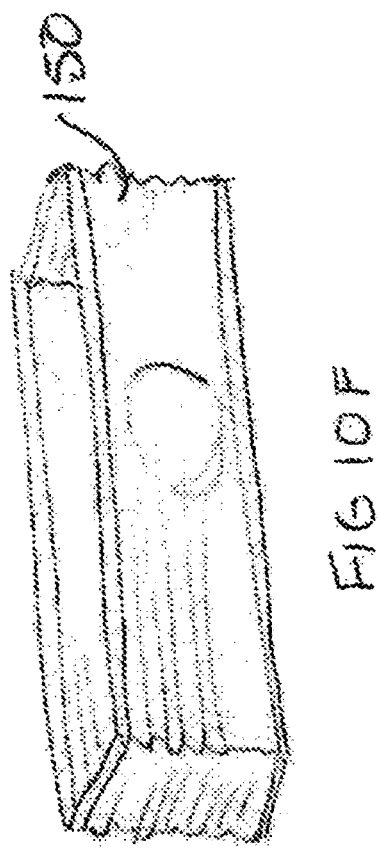
FIG 10H
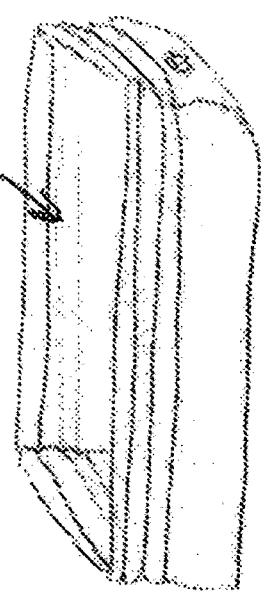
FIG 10F
FIG 10E

CONTAINER ASSEMBLY WITH MULTIPLE CONTAINER COVER AND SEALING STRUCTURE

CROSS-REFERENCE TO RELATED APPLICATIONS

The present application claims priority to and the benefit of U.S. Provisional Application Ser. No. 62/508,704 filed May 19, 2017 which is entitled "LIDDED CONTAINER SYSTEM UTILIZING A GRID TO SEAL EACH CONTAINER INDEPENDENTLY" and U.S. Provisional Application Ser. No. 62/648,841 filed Mar. 27, 2018 which is entitled "LIDDED CONTAINER SYSTEM", the contents of which are hereby incorporated by reference into the present application.

BACKGROUND

Commercial food and bar establishments store different condiments and garnishes in multiple containers. The containers are held in a container box for easy access to the content of all of the containers. Following use, containers can be removed and cellophane wrapped for storage. The step of removing containers for storage increases labor and expense and inadequate seals can lead to food spoilage. The present application addresses these and other issues and provides advantages over the prior art.

SUMMARY

The present application relates to a container system which has application for storing food items. In illustrative embodiments, the container assembly includes a support structure to removably support a plurality of containers. The assembly also includes a cover and perimeter seals to individually seal each of the plurality of containers. In illustrated embodiments, the cover includes a plurality of raised or dome shaped portions to provide interior head room for content in the containers. In embodiments described, the perimeter seals are formed of a gasket layer or bands and the support structure includes a support tray and container box.

The present application relates to a cover for sealing a plurality of spaced containers on a support structure. The cover includes a generally planar body having an outer surface and an undersurface surface. The cover also includes a plurality of raised portions having a raised surface elevated above the undersurface of the planar body to provide an interior cavity for increased capacity. A gasket band or perimeter seal extends about each of the plurality of raised portions to seal the plurality of containers. One or more latch features removably connect the cover to the support structure.

The present application also relates to a container assembly or kit. The kit includes a plurality of containers having a perimeter rim and a support tray formed of an elongate body having a support surface. In an illustrated embodiment, the elongate body of the support tray includes a plurality of openings sized for insertion of the containers so that the perimeter rims of the containers abut an upper surface of the support tray. A cover closes the containers and perimeter seals interposed between the support tray and the cover seal the plurality of containers when the cover is attached to the support tray.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIG. 1A is a cross-sectional illustration of a container assembly having a cover for individually sealing multiple containers.

FIG. 1E illustrates an embodiment of a perimeter seal or band attached to an underside of the cover.

FIGS. 1F-1H schematically illustrate embodiments of the perimeter seal or gasket band for sealing multiple containers of the assembly illustrated in FIG. 1A.

FIG. 2A is a perspective illustration of an embodiment of a container assembly wherein the support structure includes a support tray and container box for supporting containers.

FIG. 2B is a cross-sectional illustration taken along line 2B-2B of FIG. 2A.

FIG. 2C is a detailed view of a portion of the support tray shown in FIGS. 2A-2B having a plurality of spaced openings for the containers.

FIG. 2D illustrates an embodiment of a support tray having a single opening for a plurality of containers.

FIG. 2E illustrates an embodiment of the present application where the support structure is a container box.

FIG. 3A illustrates an embodiment of a container assembly wherein the support structure is a self-supporting tray with feet.

FIGS. 3B-3C schematically illustrate an embodiment of stackable support trays for the present application.

FIG. 3D-3F illustrate embodiments of support features on the cover to support feet of an adjacent support tray.

FIG. 4 is an exploded view of an alternate embodiment of a container assembly of the present application.

FIGS. 5B-5E illustrate features for rotationally connecting the cover to the support tray or support structure.

FIGS. 8A-8B illustrate another embodiment of a container assembly of the present application.

FIGS. 9A-9B illustrate another embodiment of a container assembly of the present application.

FIGS. 10A-10B illustrate a collapsible or foldable container box for the present application.

FIGS. 10C-10D illustrate another embodiment of a foldable container box.

FIGS. 10E-10H illustrated different embodiments for a collapsible support structure or box of the present application.

DETAILED DESCRIPTION OF ILLUSTRATIVE EMBODIMENTS

Figure 1B:
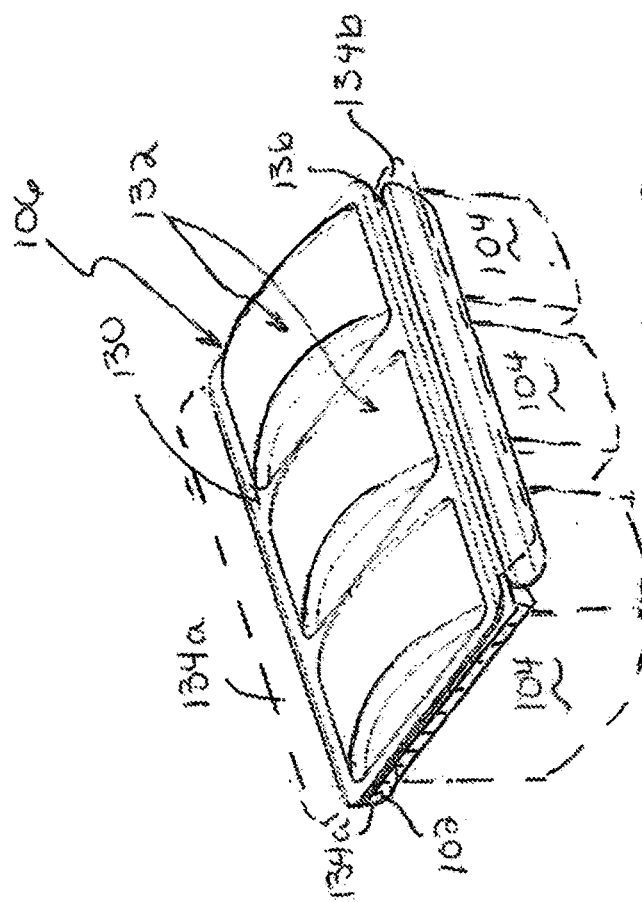
FIGS. 1B-1C schematically illustrate an embodiment of the cover having latch features for securing the cover to a support structure of the container assembly illustrated in FIG. 1A.

The present application relates to a container assembly for use with a plurality of containers. The assembly includes a cover and perimeter seals to seal each of the containers following use as described in the illustrated embodiments disclosed in the present application. FIG. 1A illustrates an embodiment of the container assembly 100 which includes a support structure 102 for supporting containers 104 and cover 106 to close each of the containers 104. The support structure 102 is formed of an elongate body having an upper surface 110, an undersurface 112 and a plurality of spaced openings 114 sized for insertion of the containers 104 therethrough. The containers 104 include a perimeter rim 120 having a rim surface 122 that overlaps the upper surface 110 to rest on the support structure 102. A plurality of perimeter seals 124 are interposed between the cover 106 and the support structure 102 to individually seal each of the containers 104.

Figure 1C:
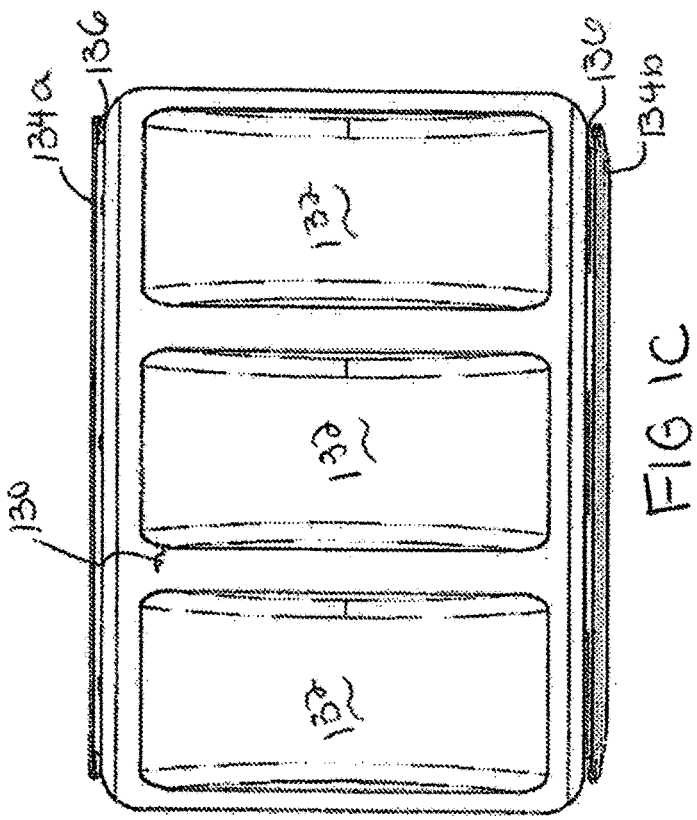

As shown in FIGS. 1A-1B, the cover 106 is formed of an elongate body 130 having a plurality of raised portions 132 spaced to align with the containers to form an upper cavity to provide space or headroom for the sealed containers. In the embodiment shown in FIG. 1B-1C, the cover 106 includes bendable portions 134a, 134b along opposed sides of the cover body 130. The bendable portions 134a, 134b are coupled to the body 130 through a flexible hinge 136. In the embodiment shown, the flexible hinge 136 is formed of a flexible or bendable material to rotate between a generally horizontal or prone position and a vertical or upright latch position as diagrammatically illustrated in FIG. 1B.

Figure 1D:
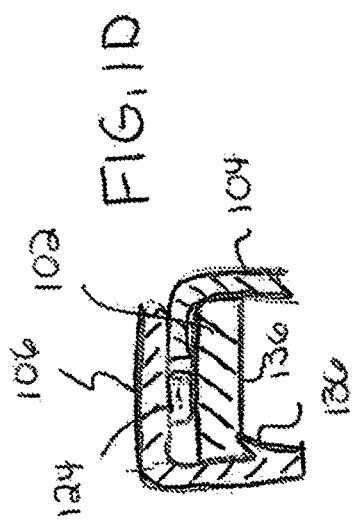
FIG. 1D illustrates an embodiment of the latch features for securing the cover to the support structure.

The bendable portions 134a, 134b include one or more latch features 136 that interface with latch features or undersurface 136 on the support structure 102 to secure the cover to the support structure 102 to seal the containers 104 as illustrated in FIG. 1D. In the illustrated embodiment, the latch feature 136 on the cover is a snap on latch that engages an undersurface of the support structure 102 as shown in FIG. 1D. In the illustrated embodiment, the raised portions 132 are dome shaped but application is not limited to a particular shape or dome shape nor is the cover limited to a rectangular shape.

In the embodiment shown in FIG. 1A, the perimeter seals 124 are located between to the undersurface of the cover 106 and the upper surface 110 of the support structure 102 to individually seal the containers when closed by the cover 106. In illustrated embodiments, the perimeter seals 124 are formed of a plurality of spaced gasket bands 140 attached to the undersurface 142 of the cover as shown in FIG. 1E. The gasket bands 140 can be formed of a rubber, silicone or other compressible gasket material. As shown the gasket bands 140 extend about the raised portions 132 to seal against the support structure or container.

In an example embodiment shown in FIG. 1F, the gasket band 140 is attached or adhered to the undersurface of cover 106 to contact and seal against the support structure 102 adjacent to an outer perimeter of the containers 104. FIG. 1G illustrates an embodiment where the gasket band 140 is disposed in a recessed cavity along the undersurface 142 of the cover and spaced to contact the perimeter rim 120 of the container. In the embodiment illustrated in FIG. 1H, the gasket band 140 is attached to the undersurface 142 of the cover to engage an inner perimeter wall surface 144 of the containers 104. In each of the embodiments shown, the gasket band 140 encloses the raised or dome shaped portions 132 of the cover as shown in FIG. 1E. Alternately, the perimeter seals 124 can be formed of a separate gasket layer interposed between the cover 106 and support structure 102 which is similarly formed of a rubber, silicone or gasket material as described herein or a gasket band or layer coupled to the support structure 102.

FIGS. 2A-2B illustrates an embodiment of the assembly of the present application wherein the support structure 102 includes a container box 150 and support tray 152. The container box 150 is sized to fit the plurality of containers 104 within an inner cavity 154 of the container box 150 enclosed by a perimeter 155 of the container box 150. The support tray 152 fits on the container box 150 and is supported on a perimeter rim 160 of the container box. As shown in FIG. 2C, the support tray 152 is formed elongate body 156 and includes a plurality of container openings 114 spaced along the elongate body 156 to form a grid tray. In an example embodiment, a height of the container box 150 is sized to hold a cooling element such as an ice block or pack or other cooling mechanism to limit spoilage of content in the containers 104. In illustrative embodiments, the support tray 152 is integrally formed or coupled to the container box 150 or is a separate component that removably fits on the container box 150 for use.

Containers 104 are inserted into the openings 114 so that rims 120 rest on an upper surface 162 of the support tray 152. The cover 106 is secured to the support tray 152 or container box 150 through one or more latch features as previously described and the containers 104 are sealed through perimeter seals 124 as previously described. In the illustrated embodiment, the support tray 152 is formed of a rectangular shaped body which is made of a plastic material. The container box 150 is formed of a clear plastic material although application is not limited to a particular material or design. Similarly the cover 106 is formed of a clear plastic material in illustrated embodiments. In one embodiment, the cover 106 includes a writable surface (e.g. formed of a textured or roughened surface) to label content of the containers for easy identification. It should be understood that application is not limited to a particular material or plastic and the support tray 152, container box 150 and cover 106 can be formed of a different materials, such a metal, an insulating material or wood.

In an alternate embodiment shown in FIG. 2D, the support tray 152 includes a single opening 114 for a plurality of containers 104. The perimeter rims 120 of the containers are supported on the upper surface 162 of the support tray 152 along opposed sides and ends of the support tray 152 enclosing the opening 114. In particular, the perimeter rim 120 of containers 104a, 104d supported at opposed ends of the tray 152 are supported along three sides and the perimeter rims 120 of containers 104b, 104c between the end containers 104a, 104d are supported along two sides. The perimeter seals 124 contact the container rim 120 or tray 152 to seal the plurality of containers 104a, 104b, 104,c, 104d as described.

FIG. 2E illustrates an alternate embodiment of an assembly of the present application where the container box 150 forms the support structure and the containers 104 are supported in the container box and the cover 106 latches to the container box 150 to close and seal the containers through perimeter seals 124. In an example embodiment (not shown), the containers 104 are supported on a perimeter ledge or rim formed about the perimeter of the container box

150. A height of the container box 150 and perimeter rim or ledge is sized to support the containers 104 above the base of the container box 150. The perimeter seal 124 and cover 106 abuts the containers to seal each of the containers in the container box 150. Alternatively, the containers 104 are supported on a base of the container box 150 as shown in FIG. 2E.

FIG. 3A illustrates an alternate embodiment of the present application where the support structure 102 is a self-supporting tray 152. The self-supporting tray 152 shown includes a body structure 166 and plurality of support feet 168 extending from an undersurface of the body structure 166. As shown, the length of feet 168 are sized to extend below a base surface 170 of the containers 104 when the containers are supported by the tray 152. Cover 106 fits on and attaches to the self-supporting tray 152 to cover and seal the containers via perimeter seals 124. In the illustrated embodiment, the tray 152 includes two feet 168 but application is not limited to a particular number or spacing of feet 168 and the tray is sized to fit on the container box 150 for use with the container box 150. In the illustrated embodiment, the self-supporting tray 152 includes a plurality of openings but application is not limited to a plurality of openings 114 and the self-supporting tray 152 can include a single opening 114 as previously described.

Figure 3C:
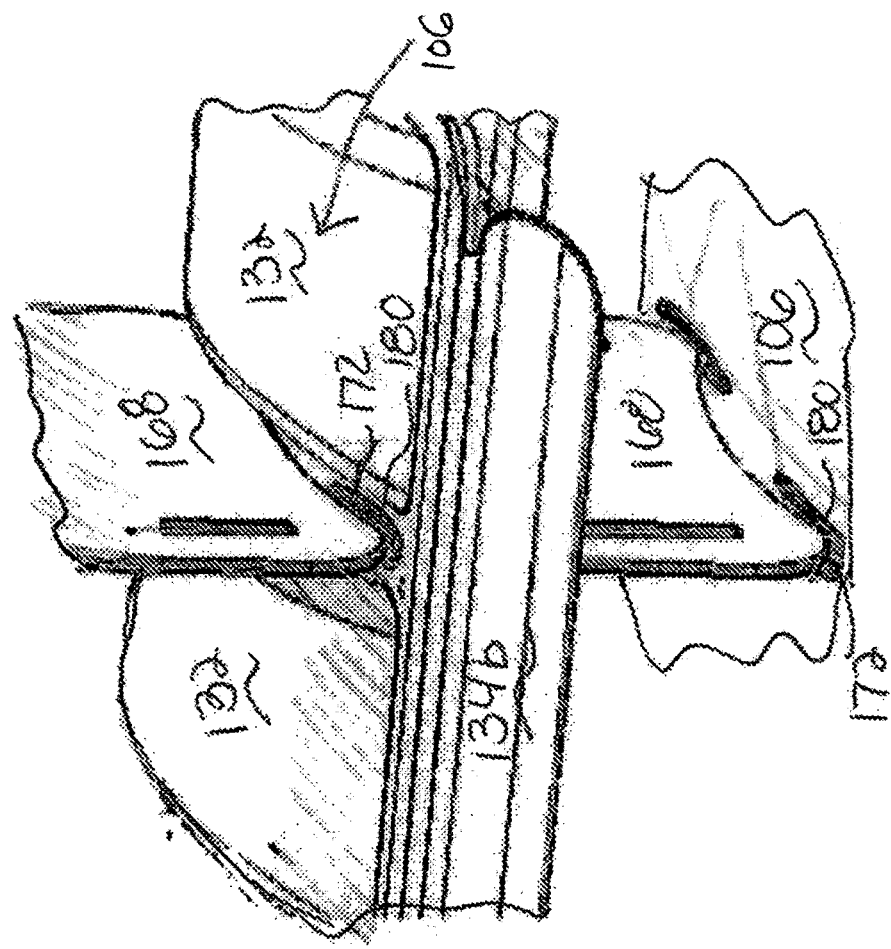
Figure 3D:
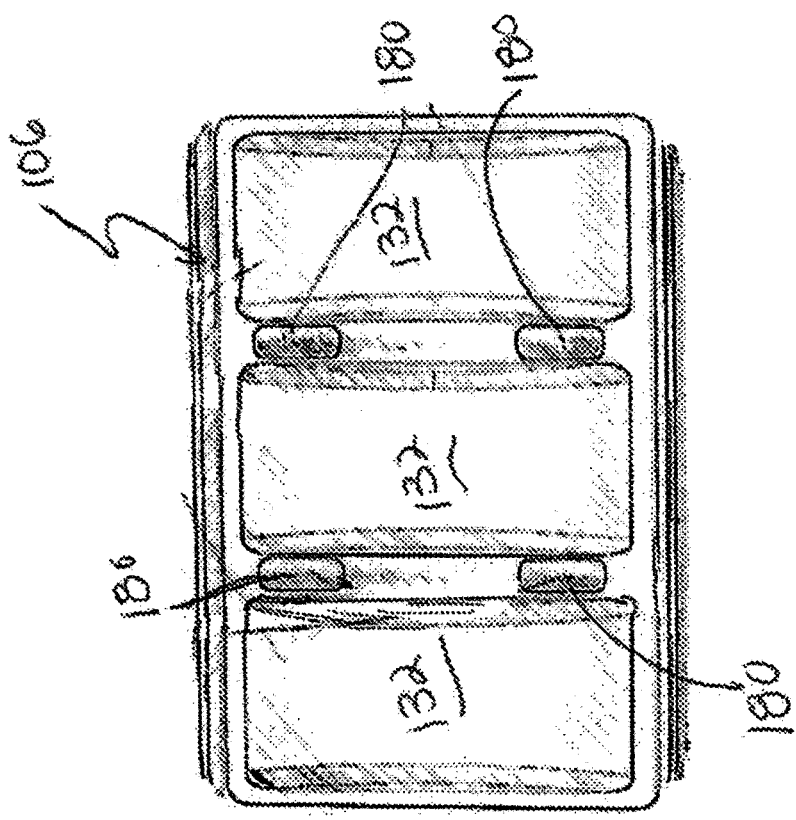

FIGS. 3B-3D illustrate self-supporting trays 152 which are stackable for easy storage and transport. The length of the feet 168 on the support trays 152 are long enough so that the support trays 152 can be stacked with a plurality of containers (not shown) covered for storage. As shown, the feet 168 of a first support tray 152-1 is supported on a cover attached to an adjacent tray 152-2 for stacking. In the embodiment shown, a bottom surface 172 of the feet 168 is contoured to match a contoured upper surface of the cover. As shown in FIGS. 3C-3D, the upper surface of the cover 106 includes a plurality of support features 180 aligned to correspond with the feet 168 of an adjacent support tray 152 when stacked. In an illustrated embodiment shown in 3E, the support feature 180 includes a pad 182 formed of a silicone or soft rubbery material having sufficient friction to limit slip or movement as well as limit damage to the cover 106. In another embodiment shown in FIG. 3F, the support feature 180 is a depression 184 formed on the cover 106 to support the feet 168 of an adjacent support tray. The depression 184 can include a friction surface or layer to limit slip or movement of the feet in the depression 184.

FIG. 4 illustrates an embodiment of the assembly including a container box 150, support tray 152 and cover 106 similar to previous embodiments described. As shown the container box 150 is a generally rectangular shaped box and includes contoured features 200 for gripping the box with the user's fingers. In the embodiment shown, the tray 152 is formed of a wedged shaped body 202 to provide an angled upper support surface 110 for the containers 104. The wedged shaped body 202 includes a plurality of openings 114 for the containers 104. The containers 104 are sized for insertion into the container openings 114 of the tray 152 as shown in FIG. 4. The raised portions 132 along the cover 106 are formed of raised dome shaped portions positioned to align with the containers openings 114 of the support tray 152 as previously described.

In the embodiment shown in FIG. 4, the perimeter seals 124 for sealing the containers are formed of a gasket layer 204 separate from the cover 106 to seal the containers for storage. The gasket layer 204 includes a plurality of spaced openings 206 spaced to align with the openings 114 of the support tray 152 and the containers 104 to form the perimeter seals for each of the containers 106 to independently seal each of the containers 104 for storage. In an alternate embodiment, the gasket layer 204 is attached or connected to the undersurface of the cover 106 to provide the perimeter seals 124 for the containers.

Figure 5B:
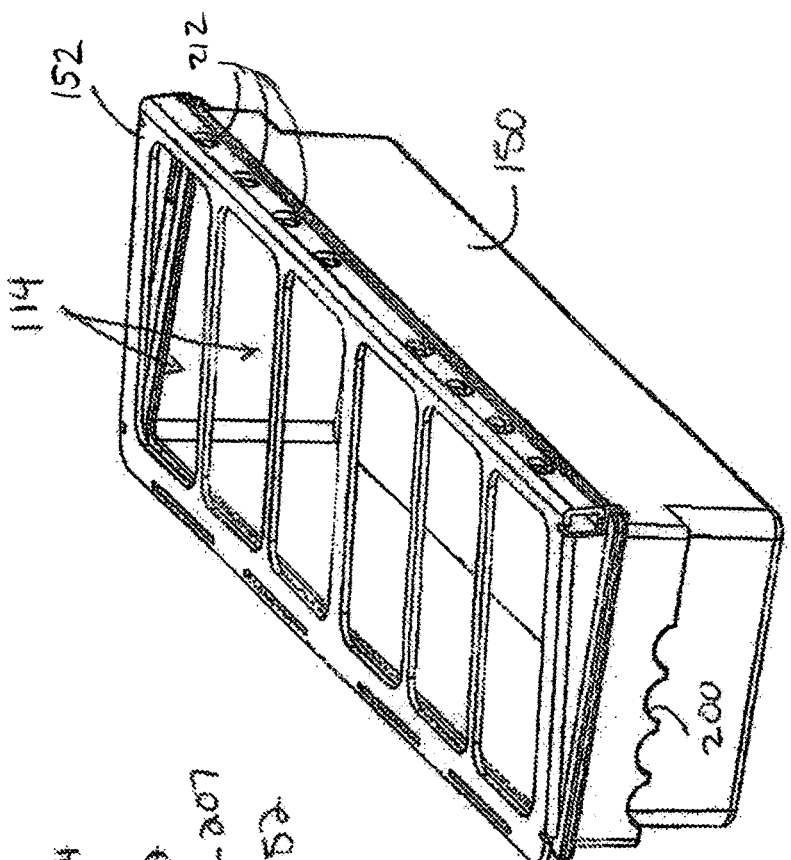
Figure 5A:
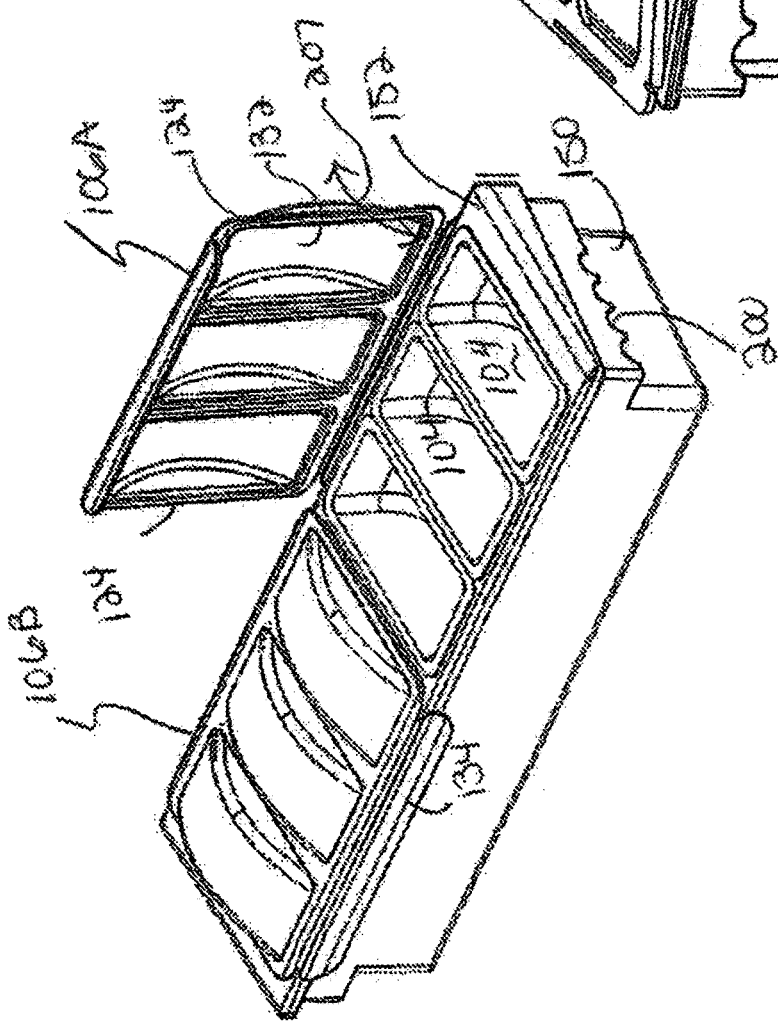
FIG. 5A illustrates a container assembly where the cover is rotationally connected to the support tray or support structure to rotate between an opened position and closed position.

FIG. 5A illustrates an assembly embodiment where the cover 106 is fixed to the support tray 152 or support structure 102 to rotate the cover between an opened position and closed position as shown by arrow 207. In the embodiment of FIG. 5A, the assembly uses multiple cover segments 106A, 106B to seal groups of containers supported on the support tray 152 separately. As shown in FIGS. 5B-5C, the covers 106A, 106B are rotationally coupled to the support structure or support tray 152 through post elements 210 configured to interface with corresponding slots 212 to rotationally connect the cover 106 to the support tray 152. In the embodiment shown, the posts 210 are formed along the bendable portion 134*b* of the cover 106A, 106B to interface with slots 212 along a backside of the support tray 152.

The post elements 210 are mushroom shaped posts having an enlarged head 214 and stem 216 as shown in FIG. 5D. The slots 212 include an insert opening 220 sized for insertion of the head 214 of the mushroom shaped post 210 therethrough and an elongate slot length 222 sized to receive the stem 216 of the mushroom shaped post 210. As shown in FIG. 5E, once the mushroom shaped post 210 is inserted into the opening 220, the stem 216 is slid along the slot length 222 to rotationally connect the cover 106 to the support tray 152. The rotatable cover is secured to the support tray through a snap on latch along opposed bendable portion 134*a* to close and seal the containers. While in the illustrated embodiment the post element 210 is on the cover and the slot 212 is on the support tray 152, application is not limited to the embodiment shown and alternatively the post elements 210 can be provided on the support tray 152 and the post slot 212 on the cover 106. In the embodiment shown in FIG. 5C, the tray 152 includes feet 168 to form a self-supporting tray 152 as previously described.

Figure 6A:
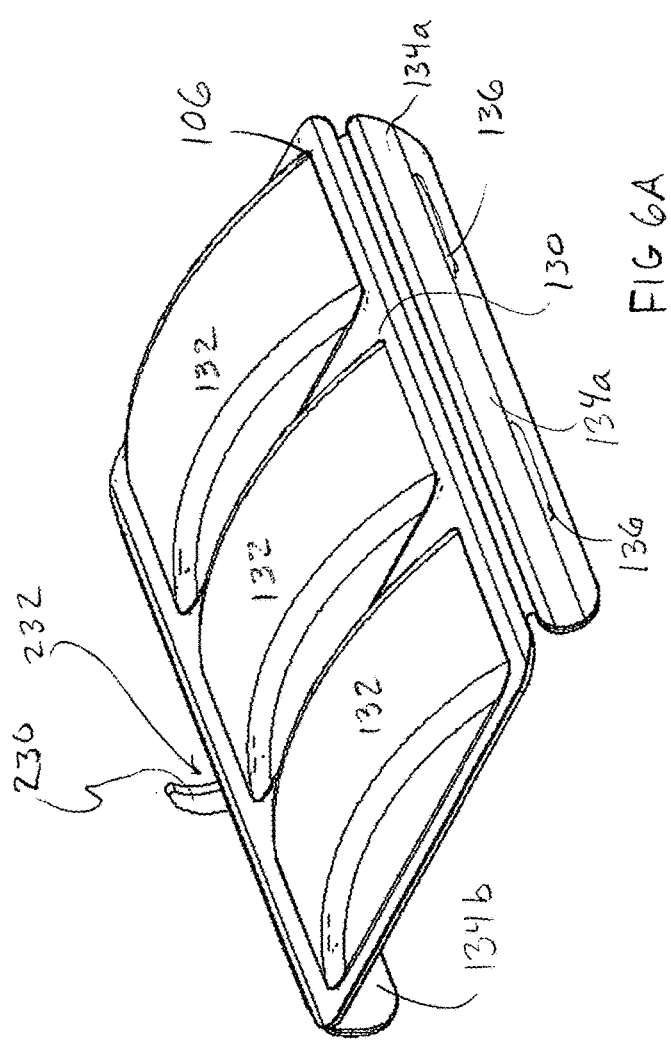
FIGS. 6A-6B illustrate an embodiment of the cover rotationally connectable to the support tray or support structure including a stop feature for limiting rotation of the cover in the opened position.
Figure 6B:
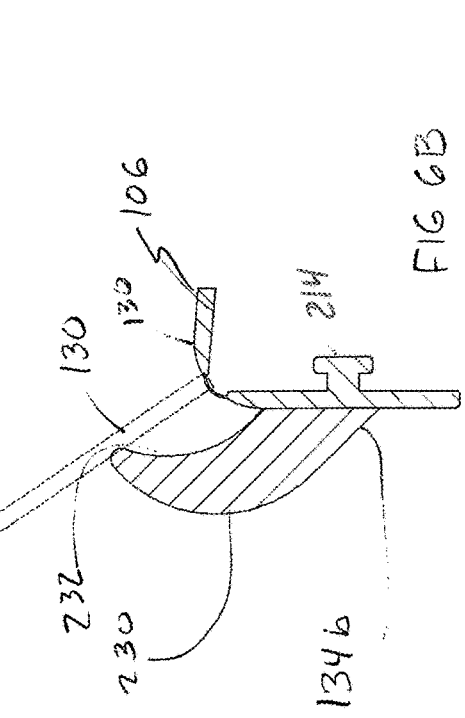

FIGS. 6A-6B illustrate an embodiment of a cover 106 rotationally connected to the support tray 152 where the bendable portion 134*b* of the cover 106 rotationally connected to the support tray includes a limit stop 230 on an upper surface of the bendable portion 134*b* for limiting over rotation of the cover 106 when opened. As shown, the limit stop 230 is formed of a rigid block having a raised contact surface 232 which interfaces with the cover to limit over-rotation of the body of the cover 106. In particular, as shown in FIG. 6B, as the rotation of the cover reaches a limit, the body 130 of the cover 106 contacts the limit stop 230 on the bendable portion 134*b* of the cover 106 to restrict further rotation. It should be understood that application of the assembly is not limited to a cover 106 fixed to one side of the support tray and removably attached to another side of the support tray and the cover can include snap on latch features along opposed sides of the cover or along opposed ends of the cover to connect the cover to the support structure 102 as shown and described herein.

Figure 7A:
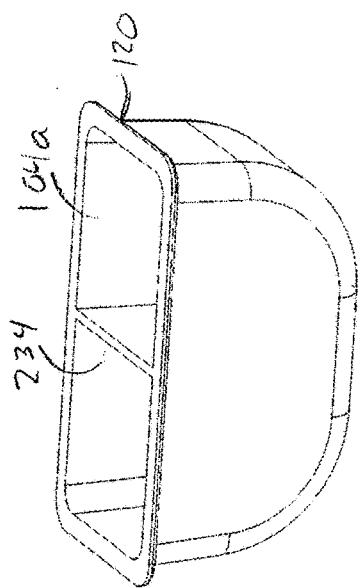
FIGS. 7A-7B illustrate embodiments of containers for the assembly of the present application.
Figure 7B:
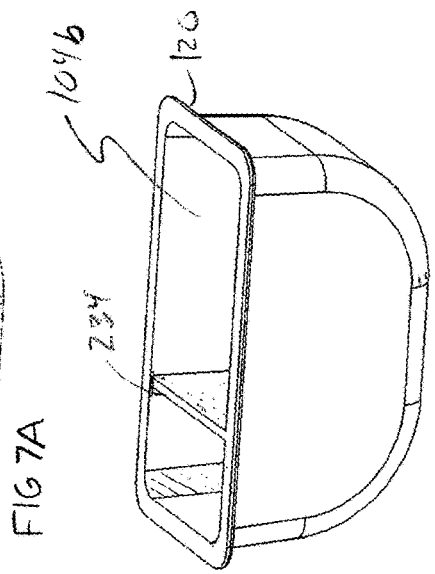

FIGS. 7A-7B illustrate different embodiments of the containers having different sizes and shapes. Each of the containers 104*a*, 104*b* shown includes a perimeter rim 120 and divider 234 to provide separate storage areas for content. In the embodiments shown each of the containers has a rounded or contoured bottom. In alternate embodiments not shown, the containers include a perforated perimeter walls or base to allow air flow therethrough. In illustrative embodiments, the containers are sized for holding cocktail garnishes, however, application is not limited to a particular use, nor a particular container shape or size.

FIGS. 8A-8B illustrate another embodiment of the container assembly of the present application. As shown, the assembly includes container box 150, support tray 152, cover 106 and a gasket layer 204 to seal the containers 104. As previously described, the gasket layer 204 includes a plurality of openings 206 aligned with the perimeter rims 120 of the containers 104 to form the perimeter seals 124. In the illustrated embodiment, the cover 106 is formed of a generally planar body having latch portions along opposed sides and opposed ends of the body of the cover include one or more latch features to removably connect the cover to the container box 150 or support tray 152.

FIGS. 9A-9B illustrate another embodiment of an assembly of the present application where the container box 150 includes a spring biased support platform 240 to support a collapsible container 104C for easy access to content. As shown, the support platform 240 is coupled to the base of the container box 150 through a spring 242. When the collapsible container 104C is full, the weight of the container 104C compresses the spring 242 to accommodate the full extended height of container 104C. As the container 104C is emptied and weight is reduced, the spring 242 exerts an upward force to collapse the length of the container 104C to raise the base of the container 104C for easy access to content.

The collapsible containers 104C are formed of collapsible paper or bellows type structure to reduce the height of the container 104C as the spring biased platform 240 is raised. The container is secured to the support tray or support structure 102 through a ring or other fastener 244 which snap fits onto the support tray 152. It will be appreciated that application is not limit to a particular fastener and different fasteners can be used to connect the collapsible container 104C to the support tray or support structure. As schematically shown, an ice pack 245 can be inserted into an empty space proximate to smaller containers 104 disposed in the illustrated container box 150.

In an embodiment shown in FIGS. 10A-10B, the container box 150 is formed of a foldable construction. As shown, the foldable construction includes a base 250, foldable end walls 252 and side walls 254. For use, a support tray 152 fits on the top of the collapsible container box 150 to retain the box 150 in an expanded form for use. Following use, end walls 252 fold inwardly to collapse the box structure. As shown an upper perimeter of the box includes a zip closure 256 to connect adjacent side walls 254 of the folded container box for transport. As shown, ice can be stored in the closed folded container box of FIG. 10B. Illustratively, the base 250, end walls 252 and side walls 254 are formed of a foldable double walled insulated material or foldable insulated bubble material, however application is not limited to a particular material. In particular, in another embodiment the foldable box is formed of a laminated double walled or multi-layered construction to provide a water resistant structure or alternatively a felt material.

FIG. 10C-10D illustrate another embodiment of the foldable construction similar to FIGS. 10A-10B. In other embodiments, the container box is formed of a collapsible structure. In the embodiment shown in FIG. 10E, the collapsible structure is formed of an inflatable structure as shown or bellows structure as shown in FIG. 10F. In an embodiment illustrated in FIG. 10G, the collapsible structure is formed of hinged side and end walls without a base connected via hinges 260. To collapse, the hinged connections 260 rotate to collapse the structure. FIG. 10H illustrates an embodiment of a collapsible structure or box formed of tongue and groove connectors 262 to assembly and collapse the container box 150.

The assembly as described has particular application for a bar box for holding and storing cocktail garnishes. In illustrated embodiments, the support tray and cover can be adapted for use with a standard sized bar box and containers for easy storage and refrigeration. The assembly as described can be covered to limit bar patrons' access to garnish or fruit as well as exposure to flies or debris while providing a garnish holder that can be easily washed and stored to limit food contamination and spoilage. Embodiments of the present application or assembly can include various internet of things (JOT) devices, such as temperature sensors, load or weight sensors which are connectable to a computer or control device through a wire or wireless interface to monitor parameters of food items in the containers.

While the application describes illustrative embodiments of the present invention, it is to be understood that the invention is not limited in its application to the details of construction and the arrangement of components set forth in the following description or illustrated in the following drawings and changes can be made in form and detail within the scope of the invention as will be appreciated by those skilled in the art. In particular, although the perimeter seals described include a gasket layer or gasket band, application is not limited to the specific embodiments shown. For example, the perimeter seals and gasket band can be formed on or attached to a perimeter rim of the containers to seal the containers when the cover is closed or the gasket layer or band can be attached to the under surface of the cover as disclosed or alternatively the perimeter seals and gasket band or layer can be formed on or attached to the upper surface of the support tray 152 or other support structure 102.

Also, it is to be understood that the terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

What is claimed:

1. An assembly comprising:
   a cover;
   a support structure;
   a plurality of containers, each of the plurality of containers having a perimeter rim at a top of the containers having an undersurface spaced from a bottom of the containers and the undersurface of the perimeter rims are aligned with and rest on an upper surface of the support structure to removably support the plurality of containers via the perimeter rims at the top of the plurality of containers;
   perimeter seals along an underside of the cover spaced to align with the perimeter rims of the plurality of containers to seal the plurality of containers; and
   at least one latch feature on the cover configured to removably attach the cover to the support structure with the perimeter rims between the cover and the upper surface of the support structure to seal the plurality of containers when the cover is closed.

2. The assembly of claim 1 wherein the cover includes individual raised structures spaced to align with the plurality of containers to provide head room at the top of the containers and the perimeter seals extend about a perimeter of the individual raised structures.

3. The assembly of claim 1 wherein the perimeter seals are formed of a plurality of gasket bands attached to an undersurface of the cover.

4. The assembly of claim 1 wherein the support structure includes a rectangular shaped support tray including a plurality of spaced container openings spaced along the support tray for the plurality of containers and the support tray includes a plurality of feet extending from an undersurface of the support tray to support the support tray in an upright position.

5. The assembly of claim 1 wherein the cover includes at least one bendable portion coupled to an elongate body of the cover through a flexible hinge and the at least one latch feature is formed on the least one bendable portion.

6. An assembly comprising:
 a plurality of containers;
 a support structure wherein the support structure includes a container box and a support tray including a plurality of spaced container openings for the plurality of containers along the support structure and the support tray is supported on a perimeter rim of the container box;
 a cover having a planar base including a plurality of individual raised portions elevated above the planar base and the planar base enclosing each of the individual raised portions and the plurality of individual raised portions spaced to align with the plurality of containers to provide head space above the containers;
 perimeter seals along an underside of the cover extending about a perimeter of each of the individual raised portions to seal each of the plurality of containers; and
 at least one latch feature on the cover configured to removably attach the cover to the support structure to seal the plurality of containers when the cover is closed and each of the plurality of containers having a perimeter rim extending about a perimeter of the containers that rests on an upper surface of the support tray so that the perimeter rims of the plurality of containers are between an undersurface of the cover and an upper surface of the support tray when the cover is attached to the support structure.

7. The assembly of claim 6 wherein the cover is rotationally connected to the support structure through a flexible hinge to rotate between an opened position and a closed position.

8. A kit comprising;
 a plurality of containers, each of the plurality of containers having a perimeter rim about an opening at a top of the containers and the perimeter rims of the plurality of containers having a thickness between an upper surface and an undersurface spaced from a bottom of the containers;
 a support structure including a support tray formed of an elongate body having an upper surface and a plurality of spaced container openings sized for insertion of the plurality of containers so that the undersurface of the perimeter rims of the plurality of containers overlap and rest on the upper surface of the tray with the bottoms of the containers spaced below the upper surface of the support tray to removably support the plurality of containers;
 a cover having one or more latch features configured to engage one or more latch features on the support structure to removably attach the cover to the support structure; and
 perimeter seals spaced to align with and enclose each of the plurality of containers to seal the perimeter rims of each of the plurality of containers.

9. The kit of claim 8 wherein the cover includes a plurality of individual raised structures spaced to align with the plurality of containers and the perimeter seals extend about each of the individual raised structures.

10. The kit of claim 8 wherein the perimeter seals comprise a plurality of gasket bands attached to an underside of the cover and spaced to align with the plurality of containers to seal the plurality of containers when the cover is closed.

11. The kit of claim 8 wherein the perimeter seals are formed by a gasket layer having a plurality of openings spaced to align with the plurality of spaced container openings of the support tray to seal the plurality of containers.

12. The kit of claim 8 wherein the support tray includes a plurality of feet extending from an undersurface of the support tray and the plurality of feet having a height dimension greater than a height of the plurality of containers to extend from the support tray below the bottom of the plurality of containers to form a self supporting tray.

13. The kit of claim 12 wherein the cover includes a plurality of spaced feet features on an upper surface of the cover to engage the plurality of feet of a stacked support tray.

14. The assembly of claim 1 wherein the support structure includes a container box and the plurality of containers are supported on the upper surface within the container box.

15. The assembly of claim 14 wherein the plurality of containers includes at least one collapsible container having a collapsible structure and the perimeter rim of the at least one collapsible container is supported on the upper surface within the container box and the container box includes a spring loaded support platform to apply a spring force to the collapsible container to collapse a height of the at least one collapsible container.

16. The kit of claim 8 wherein the support tray includes a wedge shaped structure forming a sloped upper surface and the plurality of spaced container openings are formed along the sloped upper surface.

17. The kit of claim 8 wherein the cover is rotationally connected to the support structure along a first side of the support tray to rotate between an opened position and a closed position and the one or more latch features attach the cover to a second side of the support structure.

18. The kit of claim 17 wherein the cover is rotationally connected to the support structure through a bendable portion coupled to a planar body of the cover through a flexible hinge and the bendable portion includes a limit stop feature having a contact structure extending from the bendable portion to contact the cover to limit over-rotation of the cover.

19. The assembly of claim 1 wherein the support structure includes a support tray forming the upper surface of the support structure and the support tray including a plurality of spaced container openings and the perimeter rims of the plurality of containers align with the plurality of spaced container openings to rest on the upper surface of the support structure.

20. The assembly of claim 6 wherein the individual raised portions have an arched top between upright sides.

* * * * *